United States Patent [19]

Gilbert et al.

[11] Patent Number: 4,783,038

[45] Date of Patent: Nov. 8, 1988

[54] ISOLATOR APPARATUS

[75] Inventors: Chester L. Gilbert, Forest Hills; Herbert W. LeKuch, New York; Raymond E. Snaith, Jericho; Andrew R. Ferri, Smithtown, all of N.Y.

[73] Assignee: Aeroflex International Incorporated, Plainview, N.Y.

[21] Appl. No.: 70,838

[22] Filed: Jul. 7, 1987

[51] Int. Cl.⁴ .............................................. F16F 3/00
[52] U.S. Cl. .................................... 248/570; 248/638; 267/148
[58] Field of Search ............... 248/560, 610, 611, 618, 248/620, 638, 568, 570, 569; 267/148

[56] References Cited

U.S. PATENT DOCUMENTS

| | | | |
|---|---|---|---|
| 3,025,031 | 3/1962 | Kerley | 267/148 X |
| 3,031,163 | 4/1962 | Kerley | 248/570 |
| 3,039,725 | 6/1962 | Kerley | 248/570 |
| 3,044,759 | 7/1962 | Kerley | 248/570 X |
| 3,057,593 | 10/1962 | Kerley . | |
| 3,065,959 | 11/1962 | Kerley | 248/570 X |
| 3,086,600 | 4/1963 | Kerley | 248/570 X |
| 3,204,911 | 9/1965 | Lawrence et al. . | |
| 3,204,912 | 9/1965 | Lawrence | 267/148 X |
| 3,204,913 | 9/1965 | Lawrence et al. . | |
| 3,239,207 | 3/1966 | Camossi | 248/570 X |
| 3,351,307 | 11/1967 | Michel et al. . | |
| 3,360,225 | 12/1967 | Camossi | 248/638 |
| 3,596,865 | 8/1971 | Camossi . | |
| 4,190,227 | 2/1980 | Belfield et al. . | |
| 4,397,698 | 8/1983 | Camossi . | |
| 4,586,689 | 5/1986 | Lantero . | |

FOREIGN PATENT DOCUMENTS

| | | | |
|---|---|---|---|
| 458171 | 7/1949 | Canada | 267/148 |
| 0059143 | 2/1982 | European Pat. Off. . | |
| 482511 | 3/1938 | United Kingdom . | |
| 987510 | 3/1965 | United Kingdom . | |
| 1079736 | 8/1967 | United Kingdom | 267/148 |
| 1288407 | 9/1972 | United Kingdom . | |
| 1374686 | 11/1974 | United Kingdom . | |

Primary Examiner—Ramon O. Ramirez
Assistant Examiner—Robert A. Olson
Attorney, Agent, or Firm—Wolder, Gross & Yavner

[57] ABSTRACT

An improved isolator includes a bar of elongated base-forming members adapted to be mounted to a supporting surface and an elongated load-supporting bar adapted to support the load connected to, and supported above, the base-forming bars by a pair of arched flexural supports. Each support is formed of a series of individual flexural elements. The flexural elements are oriented or biased at an acute angle with respect to the horizontal, the first group of elements being biased in an angle opposed to that of the second group. The invention demonstrates more symmetrical response over an equivalent conventional isolator and permits further tuning of isolator response in accordance with load requirements.

10 Claims, 5 Drawing Sheets

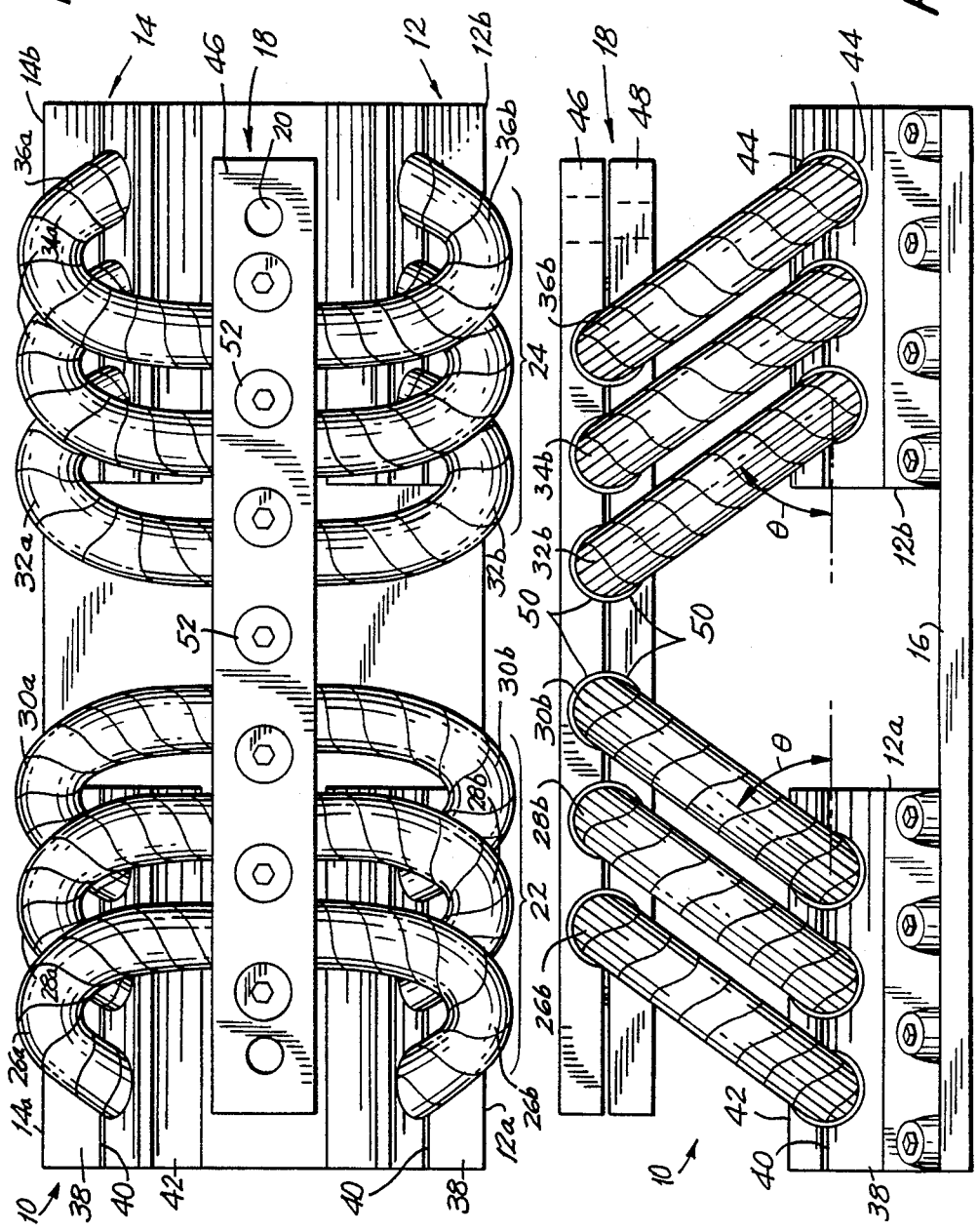

//4,783,038//

ISOLATOR APPARATUS

BACKGROUND OF THE INVENTION

The present invention relates to an improved vibration and shock isolation and damping apparatus. The purpose of such an isolator is to mitigate the effects of vibration and shock between the suspended mass and a supporting structure.

Isolators, and in particular, isolators having wire rope elements or equivalent structure as the active support members, are well known and utilized in a variety of industrial and military devices. While such isolators are intended to protect the mounted item from shock and vibrations occurring along all three spatial dimensions or axes, as a practical matter the configuration of the isolators results in a substantially greater stiffness and damping effect along one axis. Attempts to modify the isolator's response along any one axis results in substantial modification of the response along the other axes, preventing the design engineer from obtaining the desired optimum response along all three axes. Accordingly, a choice must be made as to the type of vibration of primary concern, with response along the other axes being severely compromised.

SUMMARY OF THE INVENTION

It is accordingly a primary object of the present invention to provide a new and improved isolator which permits improved control over response along all three mutually orthogonal axes.

A further object of the present invention is to provide an isolator in which the response of the isolator along each of the three mutually orthogonal axes is more nearly independent than that of conventional isolators.

Yet a further purpose of the present invention is to provide an isolator in which a more equivalent response along the three axes may be achieved.

In accordance with the above and other objects and features, the isolator of the present invention includes a pair of elongated base-forming retainer bars adapted to be mounted to a supporting surface and an elongated, load-supporting bar adapted to support the load. The base-forming bars and the load-supporting bar are connected by a pair of arched flexural support means, each support means being formed of a series of individual flexural elements running between a base bar and the load-supporting bar. The individual flexural elements of both flexural support means are oriented or biased at an acute angle with respect to the horizontal, the first group of elements being biased at an angle opposed to that of the second group.

In addition, the individual elements are supported and project outwardly from the base units at a second acute angle. The base-forming retainer bar units are divided, such that the bias and projection angles of the flexural elements may be adjusted. With such a configuration a stable lobe contour, with a more symmetrical response to shock and vibration along all three axes, is obtainable. A further benefit is that the response may be otherwise adjusted as required by specific vibration and shock conditions.

BRIEF DESCRIPTION OF THE DRAWINGS

A fuller understanding of the present invention may be obtained upon consideration of the following detailed description of a preferred, but nonetheless illustrative embodiment of the invention when taken in connection with the annexed drawings, wherein FIG. 1 is a top plan view of an isolator of the present invention;

FIG. 2 is a side elevation view of the isolator;

DESCRIPTION OF A PREFERRED EMBODIMENT

Figure 3:
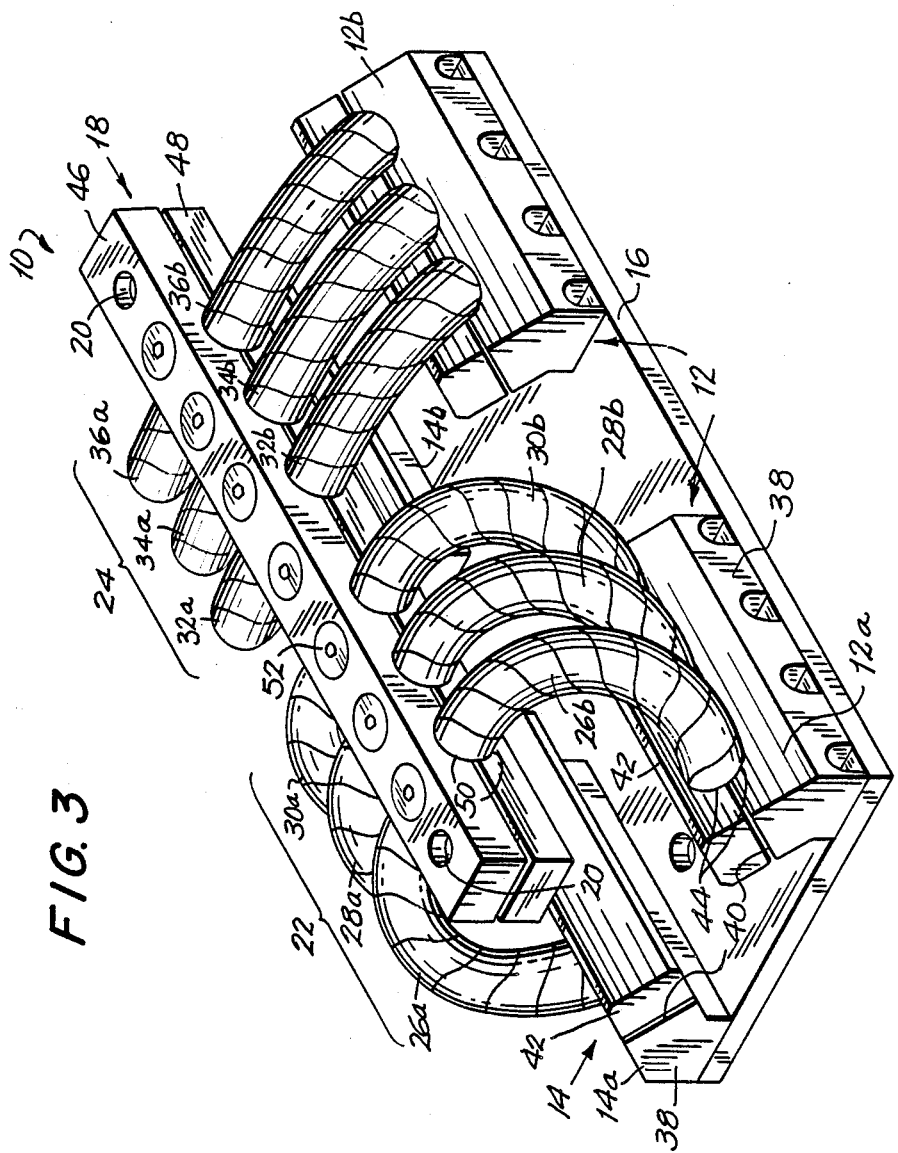
FIG. 3 is an isometric view of the isolator.

Referring to the Figures, isolator 10 includes a pair of parallel elongated base-forming retainer bar means 12, 14, each of which may be in the form of an individual pair of colinear bar segments 12a, 12b and 14a, 14b, respectively, adapted to be mounted upon base plate 16 which is affixed to the vibrating element. Mounted colinearly with and above base retainer bar means 12, 14 is elongated load-supporting bar 18. Load-supporting bar 18 is provided with appropriately dimensioned bores 20 passing therethrough, adapted to receive suitable fasteners to allow the bar to be affixed to the vibration-sensitive load for which isolation is desired.

Flexural support means 22, 24 support load-mounting bar 18 above base-forming retainer means 12, 14 and provide the vibration and shock reduction mechanism. First flexural support means 22 supports the first end of load-supporting bar 18 above the first end of base retainer bar means 12, 14 and, in particular, may run between the load-supporting bar 18 and base retainer bar sections 12a and 14a. First flexural support means 22 is comprised of a series of individual flexural support element pairs 26a, 26b, 28a, 28b, and 30a, 30b. As may be seen, one element of each of the support pairs extends between the first, and a second element of the support pairs extends between the second base retainer bar means 12a and 14a and load-mounting bar 18.

In a similar manner, second flexural support means 24 is composed of individual flexural element pairs 32a, 32b, 34a, 34b, and 36a, 36b extending between base retainer bar sections 12b, 14b and load-mounting bar 18.

The individual pairs of flexural elements 26, 28 and 30 of first flexural support means 22 are respectively situated in a series of planes biased at acute counter-clockwise angles from the horizontal as defined by the plane of base plate 16 and bars 12, 14. As shown in FIG. 2, these planes may be substantially parallel to each other in which case they each form an equal angle $\theta$ to the horizontal. The individual elements of each pair are aligned in the same plane. The individual pairs of flexural elements 32, 34 and 36 of second flexural support means 24 are similarly aligned in a series of planes, such planes being offset from the horizontal by the same angles as the corresponding elements of first flexural support means 22, measured clockwise from the horizontal. Accordingly, the flexural support means 22, 24 are biased in an equal and opposed fashion. As depicted in the Figures, elements 32, 34 and 36 are each at the same clockwise angle. The angles are preferably in the range of 50 to 70 degrees, but may extend beyond this range. The individual flexural element segment pairs 26 to 36 each may be in the form of a single elongated flexural support element extending in an uninterrupted manner through the load-supporting bar 18 and terminating in a pair of opposed ends affixed to the opposed base retainer bar means 12, 14. Alternatively, each individual flexural element segment may be formed of a separate flexural element, whereby a first end thereof is affixed to a base retainer bar means and the second end being affixed to load-supporting bar 18.

Figure 4:
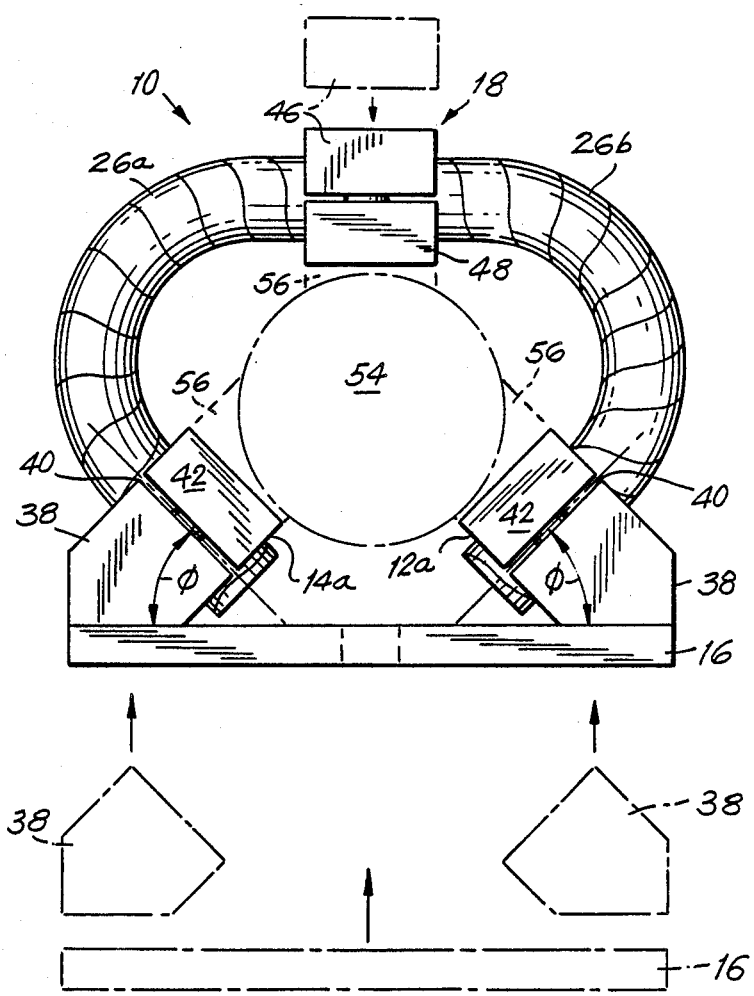
FIG. 4 is an end elevation view of the isolators illustrating, in phantom, a method of construction of the unit.

As may be best seen in FIG. 4, each of the base retainer bar means 12a, 12b, 14a, 14b may be in the form of an angular assembly, having a generally pentagonally dimensioned cross-section portion 38 adapted to rest upon base plate 16 and having an inwardly and upwardly directed face 40 at an angle $\phi$ to the horizontal. The individual flexural elements, which may be formed of multiple strand wire rope, are gripped between portion 38 and rectangular cap portion 42 in a series of semi-circular bores 44 on the opposed surfaces thereof such that the ends of the elements 26-36 are embedded within, the base retainer bars 12, 14 and extend out at the angle $\phi$ to the horizontal.

In addition, the flexural support pairs may have different characteristics. For example, pairs 26 and 36 may be formed of a first diameter wire rope while pairs 28 and 34 and 30 and 32 may be formed of different diameter wire rope, depending on the overall response desired for the isolator. Preferably, symmetry is maintained between the support means 22 and 24. Appropriate fasteners (not shown) retain the bar portions together about the flexural element segments. The angle $\phi$ is preferably in the range of 35 to 55 degrees, but may extend beyond this range. While it is preferably contemplated that the angle $\phi$ be constant for each flexural element, it may be varied between flexural element pairs to modify apparatus responses. The angles should be symmetrical between the two support means 22 and 24.

Load-supporting bar 18 may consist of upper and lower plates 46, 48, having opposed semi-circular bores 50 which allow the flexural elements to be embedded and retained within the bar 18. Appropriate fasteners, such as screws 52, are utilized to retain the plates 46, 48 together.

Construction of an isolator 10 having wire rope elements as shown in the Figures may be accomplished in a conventional manner. Referring to FIG. 4, the cap portions 42 of base retainer bar means 12a, 12b, 14a, 14b, as well as lower bar plate 48 of load-retaining bar 18, are mounted in proper orientation to each other on a rotatable mandrel 54 by adapter blocks 56. The mandrel and adapter blocks are of a size appropriate for the intended relationship between the bar members.

Wire rope from a continuous reel is clamped within a semi-circular bore 44 in a cap portion 42. The mandrel is then rotated and the wire segment directed through the appropriate semicircular bore 50 in lower bar plate 48 and the corresponding semicircular bore 44 in the opposed cap portion 42, thus providing a preset buck to the element. The wire rope is then clamped in position and cut to approximate size from the reel. The process is repeated until all the elements forming the complete flexural members are in place.

The upper plate 46 of load-supporting bar 18 and lower portions 38 of base retainer bar units 12a, 12b, 14a, 14b, with base plate 16, are then fastened to the respective mandrel-mounted members. Once fastening has been accomplished, the wire rope elements are trimmed to final length. The completed isolator may then be removed from the mandrel.

An isolator of the present invention exhibits improved and more uniform response to vibration as compared to an equivalent isolator of conventional design.

Figure 5:
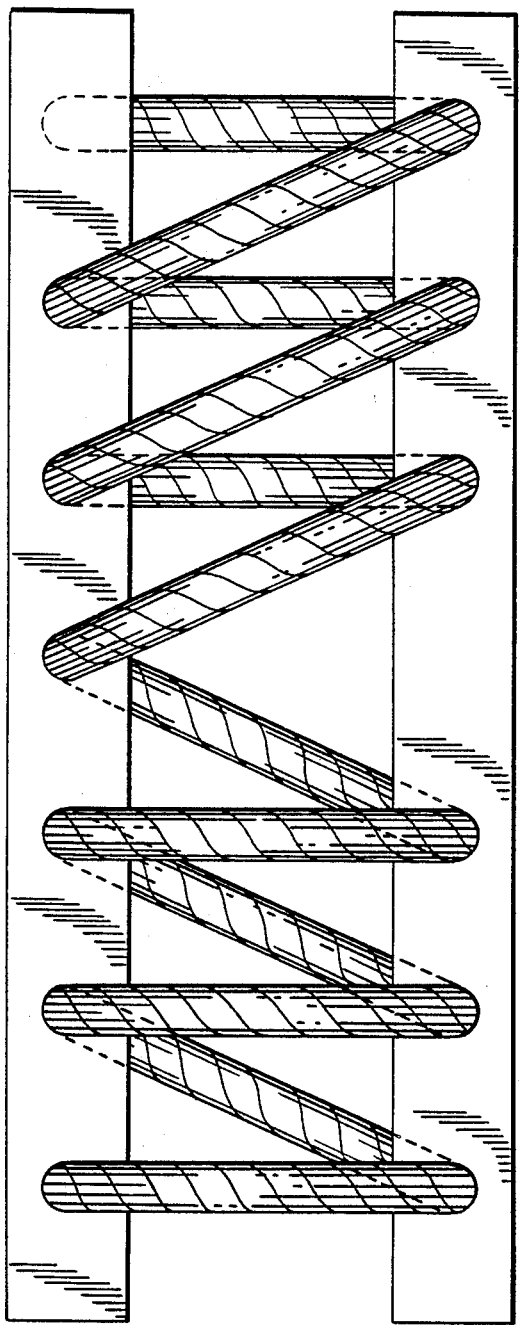
FIG. 5 is an elevation view of a typical isolator of the prior art.
Figure 6:
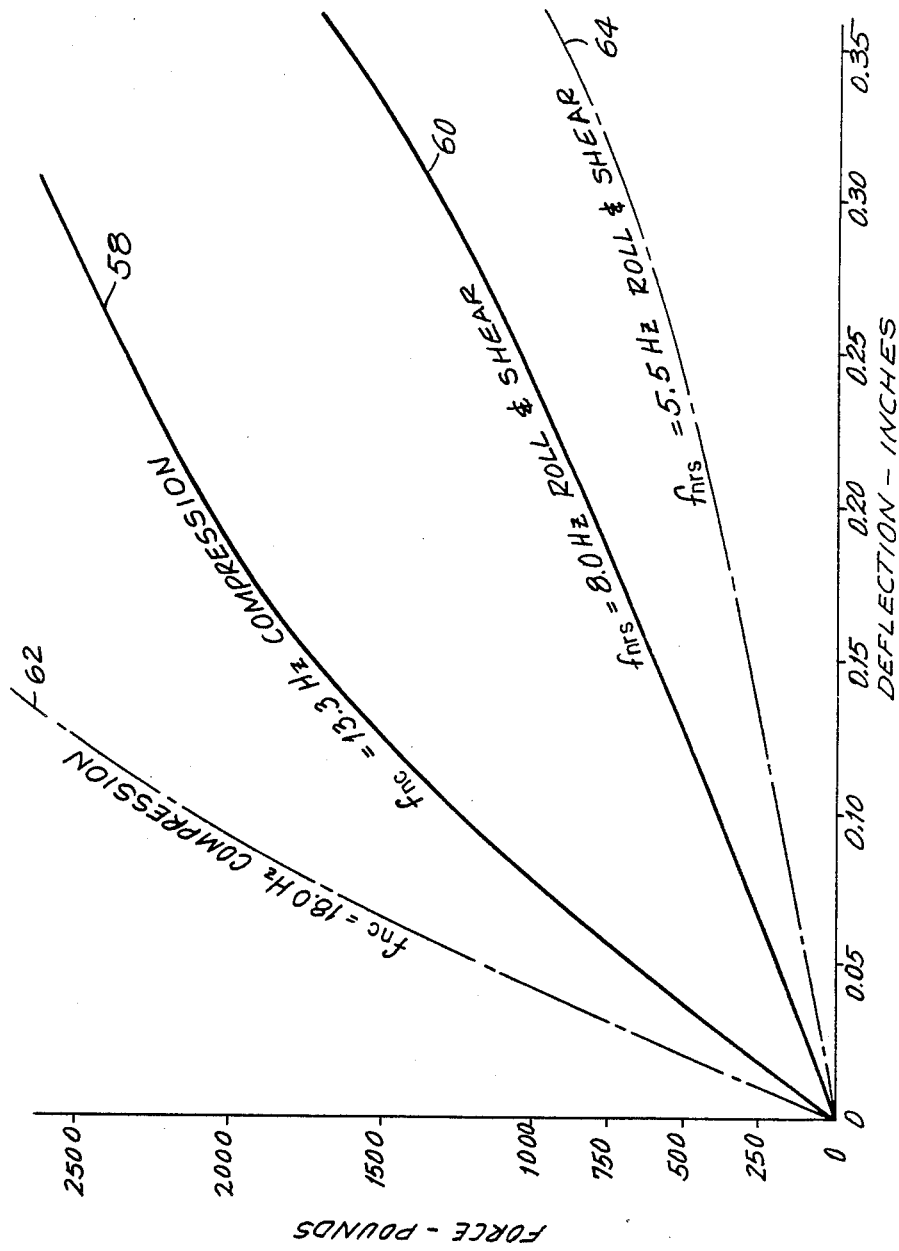
FIG. 6 is a graph illustrating the improved performance of the isolator of the present invention over the conventional isolator of FIG. 5.

FIG. 6 is a graph depicting the performance of a six-loop isolator as shown in the Figures and a six-loop conventional helical isolator of equivalent size as shown in FIG. 5. In both units the flexural elements are formed of 1.125 inch diameter CRES 6×19 cable. The isolator of the present invention is formed with an angle $\theta$ of 60 degrees and an angle $\phi$ of 45 degrees.

As may be seen, the spring rates for compression and roll/shear, curves 58, 60 respectively, for the isolator of the present invention are substantially closer together than the compressor and roll/shear response curves 62, 64 for the conventional isolator. Compression, roll and shear represent the three principal orthogonal directions. In addition, the natural frequencies for compression and roll/shear for the new isolator exhibit considerably less divergence than those for the conventional isolator. Both factors are illustrative of more symmetrical response. In addition, by adjustment of the angles $\theta$ and $\phi$ the response can further be tuned as required.

What is claimed is:

1. An improved isolator apparatus comprising:
   first and second parallel base-forming bar means affixed to a base plate for securing the apparatus to a structure subject to vibration and shock;
   a load-supporting bar means parallel to said base-forming bar means for securing the apparatus to a structure sought to be isolated from vibration; and
   first and second flexural support means supporting said load-supporting bar in a force-damping relationship above said base-forming bars, each of said flexural support means comprising a group of opposed flexural support element pairs, each of said flexural support element pairs having a first element having a first end affixed to the first base-forming bar means and a second end affixed to said load-supporting bar and a second element having a first end affixed to said second base-forming bar and a second end affixed to said load-supporting bar, the flexural support element pairs of said first and second flexural support means being located and offset in planes at acute angles from the horizontal defined by said base means, the offset of the element pairs of said first group being equal and opposite to that of said element pairs of said second group.

2. The apparatus of claim 1, wherein said base-forming bars each comprise first and second colinear base-defining segments, said first flexural support means being affixed to said first base-defining segments.

3. The apparatus of claim 2, wherein each of said base-defining segments is independently positionable upon said base plate.

4. The apparatus of claim 3, wherein said flexural support elements are formed of wire rope.

5. The apparatus of claim 4, wherein each flexural support element pair is formed of a unitary wire rope segment.

6. The apparatus of claim 1, wherein said flexural support elements project outwardly from said base forming bar means at acute angles with respect to the horizontal.

7. The apparatus of claim 6, wherein said angles of projection is in the range of 35 to 55 degrees.

8. The apparatus of claim 7, wherein said offset angles are in the range of 50 to 70 degrees.

9. The apparatus of claim 8, wherein said offset angles are all equal in magnitude.

10. The apparatus of claim 9, wherein said angles of projection are all equal in magnitude.

* * * * *